Figure 1:
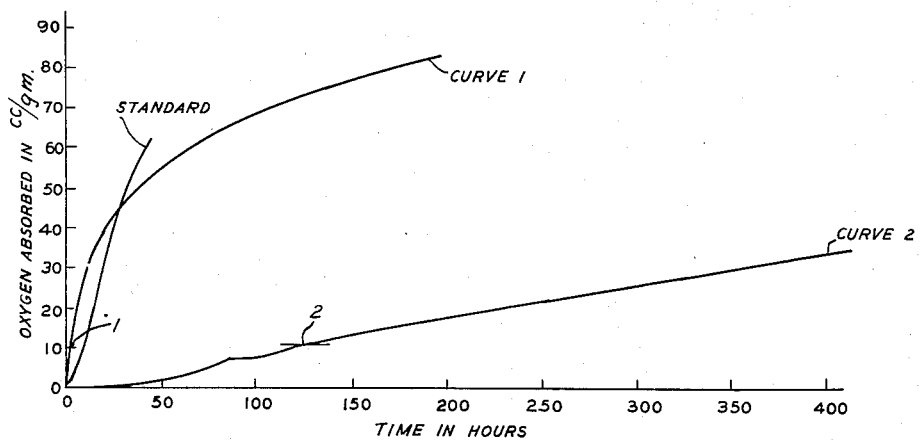

Jan. 10, 1961 W. L. HAWKINS ET AL 2,967,850
COMPOSITIONS OF STABILIZED STRAIGHT CHAIN HYDROCARBONS
CONTAINING CARBON BLACK AND A COMPOUND
HAVING R-S-S-R STRUCTURE
Filed Nov. 29, 1956 2 Sheets-Sheet 1

INVENTORS W. L. HAWKINS
V. L. LANZA
F. H. WINSLOW

BY
ATTORNEY

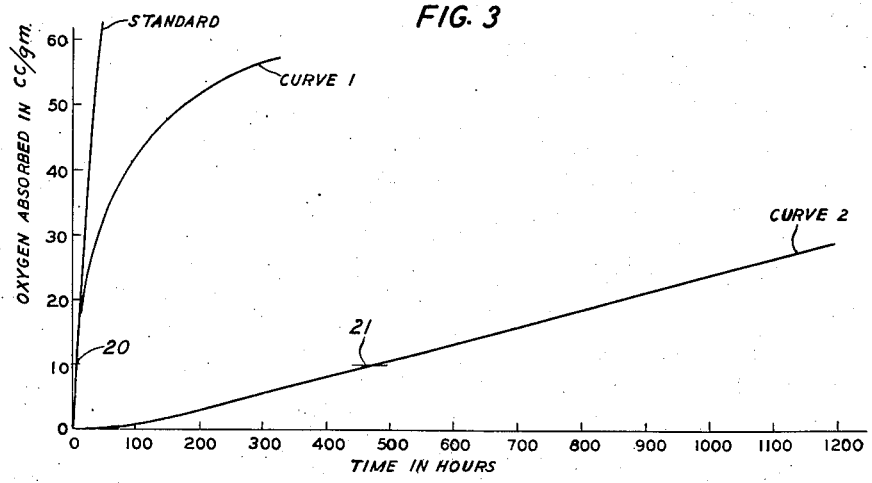
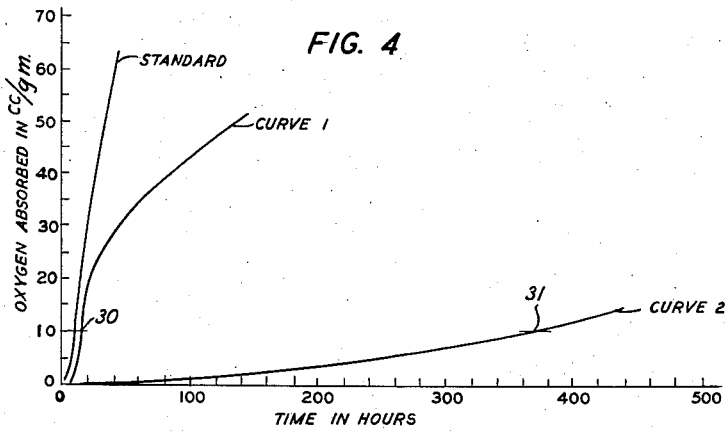
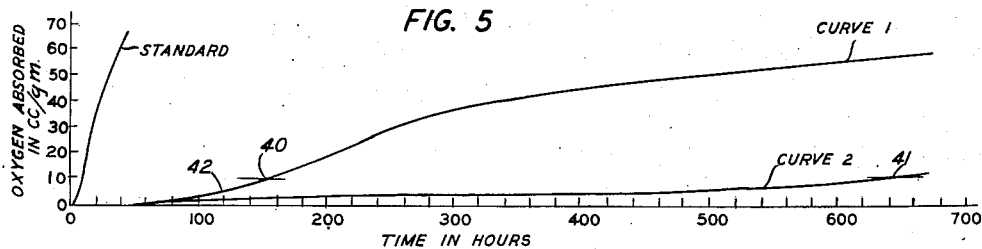

United States Patent Office 2,967,850
Patented Jan. 10, 1961

2,967,850

COMPOSITIONS OF STABILIZED STRAIGHT CHAIN HYDROCARBONS CONTAINING CARBON BLACK AND A COMPOUND HAVING R-S-S-R STRUCTURE

Walter L. Hawkins, Montclair, Vincent L. Lanza, Summit, and Field H. Winslow, Springdale, N.J., assignors to Bell Telephone Laboratories, Incorporated, New York, N.Y., a corporation of New York Filed Nov. 29, 1956, Ser. No. 625,577

10 Claims. (Cl. 260—41)

This invention relates to the stabilization of polymeric materials against oxidation by the inclusion therein of small amounts of retarder and to highly stabilized products so produced. This invention is primarily directed to such processes and products in which protection against oxidation taking place under the influence of ultraviolet radiation is imparted to the polymeric material by the additional inclusion therein of finely dispersed particles of carbon.

The oxidative mechanism against which protection is afforded in accordance with this invention takes place only in essentially saturated hydrocarbon polymeric materials containing tertiary hydrogen atoms and this invention is therefore restricted to compositions containing such polymeric materials. Polymers containing tertiary hydrogen atoms are of two types; those containing random numbers and spacing of tertiary hydrogen atoms such as polyethylene and those containing ordered hydrogen atoms such as polypropylene. This invention is concerned with either category of polymers containing tertiary hydrogen atoms and also with copolymers and mixtures both of which contain at least one such polymer. Examples of polymers included in this invention in addition to those named are polymers of butene-1, 3-methyl butene-1, 4-methyl pentene-1, 4, 4-dimethyl pentene 1, dodecene-1 and 3-methyl pentene-1.

Some of the polymers under consideration may have as few tertiary hydrogen atoms as one for every hundred carbon atoms while others such as polypropylene may have as many as one tertiary hydrogen atom for every two carbon atoms. Although the most common polymeric materials falling within the class above outlined are the polymerization products of monomers containing four or fewer carbon atoms, polymerized products of higher order monomers may also be stabilized in accordance with this invention providing they contain tertiary hydrogen atoms as may copolymers and mixtures containing such polymers. For a discussion of the oxidative mechanism against which protection is imparted in accordance with this invention, see Modern Plastics, volume 31, pages 121 to 124, September 1953.

Some of the polymeric materials included in the class above set forth have already attained considerable commercial importance; notably, the various types of polyethylene. Some of the other materials in this class have excellent electrical and mechanical properties and will doubtless find widespread use in the near future.

Many of the most important applications of polyethylene such as its use in cable sheathings, depend on its very good mechanical properties such as high tensile strength and abrasion resistance coupled with its resistant properties against water and water vapor. Other uses take advantage of its high dielectric strength in applications such as primary insulation of wire conductors.

Unfortunately, however, polymeric materials such as polyethylene and the others listed are subject to deterioration from sunlight and heat both of which induce oxidation of the long chain polymeric structure and thereby impair tensile strength, low temperature brittleness and dielectric properties. Oxidative deterioration by heat in the absence of ultraviolet is here referred to as "thermal oxidation" and as the term implies, the effect is substantially accelerated by an increase in temperature.

It was discovered some time ago by workers in the field that effects due to ultraviolet absorption could be effectively avoided by the incorporation into the polymer of small amounts of finely dispersed particles of carbon black. Effective light shielding from ultraviolet emission is afforded by the incorporation into the polymer of from about .05 percent to about 5 percent by weight, and usually about 3 percent, of carbon black particles of the order of somewhat less than 1000 angstroms in size. Many types of carbon black are commercially available for this purpose and their use is widespread. Any such materials are effective in combination with the retarders of this invention in producing a stabilized polymeric product.

The deleterious degradative effect of thermal oxidation on polymers such as polyethylene and polypropylene has also received considerable attention by researchers in the field. Effective "antioxidants" developed for this purpose are generally secondary amines of aromatic compounds which may, in addition to the amino grouping, contain as an additional ring substituent a branched or normal aliphatic radical generally containing three or more carbon atoms. As is well known, a general requirement of such antioxidants is that they contain an antioxidant group such as the secondary amino group attached to an aromatic ring the compound having such a structure that its resulting radical is stabilized by resonance energy. Much consideration has been given such antioxidants in the texts, see, for example, G. W. Wheland's "Advanced Organic Chemistry," 2nd edition, chapters 9 and 10.

However, even though it has been known for some time that ultraviolet degradation may be effectively prevented by the use of a dispersion of carbon black particles, and even though thermal oxidative degradation may be avoided by the use of any of several antioxidants commercially available for this purpose, a further difficulty has been encountered in attempts to prepare polymeric compositions which are at the same time stabilized against both influences. In view of the knowledge that certain carbon blacks when incorporated into essentially saturated hydrocarbon polymers have a mild antioxidant effect in addition to shielding the substance against ultraviolet radiation, it was expected that the incorporation of known antioxidants into polymeric materials containing such carbon blacks would result in increased stability against thermal oxidation. It was discovered, however, that, not only is the effect of the presence of such antioxidants and carbon black in the polymer not additive but that the effectiveness of the antioxidant is reduced several fold in the presence of carbon black and in many instances, is rendered completely ineffectual in that such a product has no more resistance against thermal oxidative degradation than does a sample containing no thermal antioxidant whatever.

In accordance with the disclosure herein, we have discovered a class of materials which, when combined with carbon black in polymeric materials such as polyethylene, results in a stabilized product which compares favorably with polymeric materials in which have been incorporated the most effective commercially available antioxidants and which contain no carbon black. These materials, which are for the most part completely ineffectual in the absence of carbon black, appear to owe their effectiveness to a different mechanism than that of the commercially available antioxidants.

The retarder materials of this invention include the dicyclic-disulfides falling within the general formula $$R—S—S—R'$$

in which R and R' are ring structures each containing at least one carbon atom such for example as phenyl, naphthyl, anthryl, thiazole or other aromatic or heterocyclic radicals and S is a sulfur atom. Either or both of the cyclic moieties of these compounds may additionally contain one or more aliphatic substituents providing that the total maximum number of carbon atoms in the moiety is 30.

Retarders herein also include dimers and higher order polymers containing two or more of the R—S—S—R' units as above defined. Such compounds may be synthesized by iodine titration or other oxidation of dithiols and dithiohydroquinone.

Examples of retarders within the scope of this invention follow:

*Compounds related to the diaryl disulfides* o-Methylphenyl phenyl disulfides
m-Methylphenyl phenyl disulfides
p-Methylphenyl phenyl disulfides
o-Ethylphenyl phenyl disulfides
m-Ethylphenyl phenyl disulfides
p-Ethylphenyl phenyl disulfides
n-Propylphenyl phenyl disulfides (o, m, p)
Iso-propylphenyl phenyl disulfides (o, m, p)
n-Butylphenyl phenyl disulfides (o, m, p)
Iso-butylphenyl phenyl disulfides (o, m, p)
Sec-butylphenyl phenyl disulfides (o, m, p)
Tert-butylphenyl phenyl disulfides (o, m, p)
o-Dimethylphenyl disulfides—symmetrical
m-Dimethylphenyl disulfides—symmetrical
p-Dimethylphenyl disulfides—symmetrical
o-Dimethylphenyl disulfides—unsymmetrical
m-Dimethylphenyl disulfides—unsymmetrical
p-Dimethylphenyl disulfides—unsymmetrical
o-Diethylphenyl disulfides—symmetrical
m-Diethylphenyl disulfides—symmetrical
p-Diethylphenyl disulfides—symmetrical
o-Diethylphenyl disulfides—unsymmetrical
m-Diethylphenyl disulfides—unsymmetrical
p-Diethylphenyl disulfides—unsymmetrical
Di-n-propylphenyl disulfides—symmetrical (o, m, p)
Di-iso-propylphenyl disulfides—symmetrical (o, m, p)
Di-n-propylphenyl disulfides—unsymmetrical (o, m, p)
Di-iso-propylphenyl disulfides—unsymmetrical (o, m, p)
Di-n-butylphenyl disulfides—symmetrical (o, m, p)
Di-iso-butylphenyl disulfides—symmetrical (o, m, p)
Di-sec-butylphenyl disulfides—symmetrical (o, m, p)
Di-tert-butylphenyl disulfides—symmetrical (o, m, p)
n-Dibutylphenyl disulfides—unsymmetrical (o, m, p)
Iso-dibutylphenyl disulfides—unsymmetrical (o, m, p)
Sec-dibutylphenyl disulfides—unsymmetrical (o, m, p)
Tert-dibutylphenyl disulfides—unsymmetrical—(o, m, p)
Phenyl beta-naphthyl disulfide
Phenyl alpha-naphthyl disulfide
Di-beta-naphthyl disulfide
Di-alpha-naphthyl disulfide
Phenyl anthryl disulfide
Dianthryl disulfide
Naphthyl anthryl disulfides
Di-3,3'-acetanilide disulfide
Dibenzoxazole disulfide Although the basic retardent action herein described is obtained only in the presence of carbon black so that the materials are completely ineffectual in diminishing degradative effects due to thermal oxidation in clear polymeric samples not containing carbon black, it is known that antioxidant action may be obtained in clear samples by the incorporation of antioxidant substituents such as hydroxyl or secondary amine radicals. As is well known effective antioxidant action would be additionally dependent upon the presence of a blocking influence furnishing steric hindrance to the compound so formed so as to prevent the antioxidant grouping from being oxidized too rapidly to assure a reasonable protective life. In the instance of a fused ring structure such as hydroxylated dinaphthyl disulfide the second ring of the moiety may adequately hinder the hydroxyl radical to the extent required when the hydroxyl and the sulfur bond are on the same ring. In the instance of disulfides of single ring compounds containing as a ring substituent a hydroxyl or other antioxidant grouping, a second ring substituent such, for example, as a tertiary-butyl radical may be added in accordance with conventional practice. It should be noted, however, that where such compounds are used, the protection afforded in clear substances is due to a mechanism different from the retarder action resulting from the use of any dicyclic-disulfides not containing antioxidant groups in combination with carbon black in the polymer.

Figure 2:
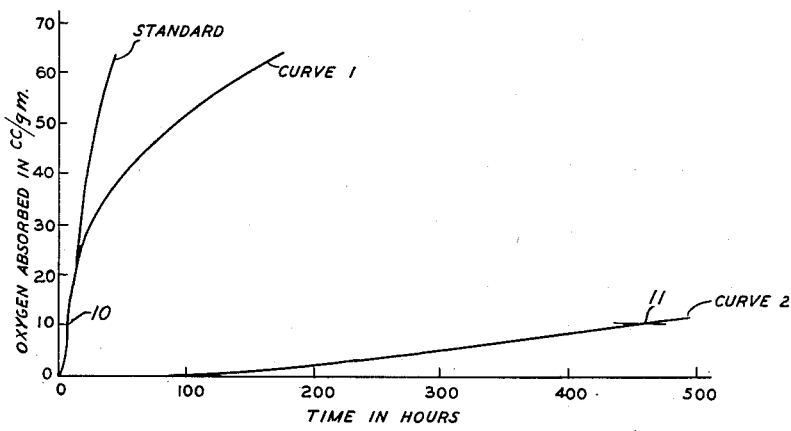

Understanding of the described invention may be facilitated by reference to the following figures of the accompanying drawing in which:

Fig. 1 on coordinates of oxygen absorbed on the ordinate and time in hours on the abscissa presents two curves plotted from experimental data indicating the rates of oxidation of two samples of polyethylene containing diphenyl disulfide, one of which contains carbon black and one of which does not and also contains a "standard" curve for a sample of polyethylene containing no additive Fig. 2 presents similar curves for clear and black samples of polyethylene containing di-2,2'-acetanilide-disulfide;

Fig. 3 presents two curves on the same coordinates for clear and black samples of polyethylene containing di-4,4'-acetanilide-disulfide;

Fig. 4 presents similar curves for clear and black samples of polyethylene containing benzothiazyl disulfide; and Fig. 5 presents similar curves for clear and black samples of polyethylene containing N,N'-dimorpholine disulfide.

A "standard" curve is included in each of the figures for comparison purposes. All five figures are representative of data taken from a standard accelerated aging test for polyethylene. Such tests are well known and data taken therefrom is of known significance. To aid in the description of these figures, an outline of the accelerated testing procedure used is set forth below.

*Accelerated test procedure*

The saturated hydrocarbon polymer, which in all of the tests for which data is reported on the accompanying figures was polyethylene, together with a retarder and carbon black where required was prepared by mill massing on a 6 inch by 12 inch two roll mill having roll speeds of approximately 25 and 35 r.p.m. with the rolls at a temperature of about 120° C. The polyethylene used in these studies was a commercial, high-molecular weight, high-pressure polymer supplied by the Bakelite Company as DYNK. This particular polymeric product finds widespread use in industry in such applications as cable sheathing and primary conductor insulation. Where carbon black was to be included, a master batch of polyethylene and 25 percent by weight of carbon black was first prepared by milling, after which the concentration of carbon black was cut back to about 3 percent by dilution with additional polyethylene. This procedure was followed to insure good dispersion of the carbon black throughout the polymer. In instances where the melting point of the retarder under study was above 255° F., the master batch also contained an amount of such retarder in excess of the amount to be tested. In such instances, the excess of retarder was proportionally equal to the excess of carbon black so that the amounts of both additives could be reduced to the desired levels by the addition of polyethylene. Where the melting point of the retarder was below 255° F., it was added directly in the desired concentration to the diluted mix which already contained the desired amount of carbon black, special care being taken to avoid loss of retarder by evaporation.

Test sheets of the polymeric material containing both the retardent and the carbon black were molded to a thickness of approximately 50 mils, and 14-millimeter diameter disks were cut from these sheets. Four such disks, each in a shallow glass cup, were placed in a Pyrex glass tube attached to a mercury manometer together with about 2 grams of powdered barium oxide or similar absorbent. The reaction vessel, after being successively evacuated and filled with oxygen to assure a complete oxygen environment, was again filled with oxygen and was placed in an air-circulating strip-heater oven maintained at 140° C. and of such design as to assure a variation of no more than 1° C. throughout the entire volume in the oven. The reaction vessel was immediately connected to an oxygen gas burette with a short length of polyvinyl chloride tubing. After reaching temperature equilibrium at the said temperature of about 140° C., the system was adjusted to zero reading at atmospheric pressure. Readings of oxygen uptake were made as required at atmoshperic pressure, one such reading being taken every 4 to 12 hours.

Referring again to Fig. 1 the coordinates are oxygen-absorbed in cubic centimeters per gram of sample as measured on the mercury-filled manometer on the ordinate, and time in hours on the abscissa. The plotted data was taken from a run in which the polymeric samples were maintained at a temperature of 140° C. Curve 1 is plotted from absorption data taken from a test conducted on a sample of polyethylene containing 0.1 percent of diphenyl disulfide and containing no dispersed carbon while curve 2 is plotted from data taken from a test run conducted on a sample of polyethylene containing 0.1 percent by weight of the same retarder and in addition containing 3 percent by weight of carbon black particles. The "standard" curve, included for comparison, refers to a sample of polyethylene containing no additives tested under the same conditions. In interpreting curves such as those depicted in Fig. 1, it is generally assumed that the useful properties of polyethylene and other such polymeric materials are not critically affected until the amount of oxygen absorbed by the polymer is of the order of 0.5 percent by weight which is equivalent to about 10 cubic centimeters of absorbed oxygen in the ordinate units.

Examining curve 1 of Fig. 1 it is seen that oxygen absorption proceeded rapidly from the origin attaining the critical limit of 10 cubic centimeters after about 3 hours at point 1. The exceedingly rapid rate of oxidation indicated by curve 1 shows that little or no protection was afforded the polymer by the diphenyl disulfide in the absence of carbon black. In contrast with curve 1 it is seen that the polyethylene sample containing carbon black in addition to the same amount of diphenyl disulfide oxidized at a much slower, approximately linear, rate with time and had absorbed 10 cubic centimeters of oxygen only after about 123 hours.

Fig. 2 contains two curves together with a "standard" as in Fig. 1. Curve 1 is plotted from accelerated data taken from a test run on a sample of polyethylene containing 0.1 percent by weight of di-2,2'-acetanilide disulfide and containing no carbon black. The very steep slope from the origin through point 10 indicates that very little protection, if any, is afforded the polymer by the retarder in the absence of carbon black, the sample having absorbed 10 cubic centimeters of oxygen per gram after about 8 hours of exposure at 140° C. The gradual slope of curve 2 which is plotted from a test run made on a sample of polyethylene containing in addition to 1 percent of di-2,2'-acetanilide disulfide, about 3 percent by weight of dispersed carbon black particles indicates that in the presence of carbon black the same retarder material effectively inhibits chain degradation of the polyethylene. The sample so protected has absorbed 10 cubic centimeters of oxygen only after about 464 hours of exposure to an oxygen atmosphere at 140° C. (point 11).

The curves of Fig. 3 resemble those of Fig. 2 very closely as the retarders are chemically related and the amounts are the same. It is seen that the retarder which in this instance was di-4,4'-acetanilide disulfide again affords little protection to the clear sample of polyethylene (curve 1), the sample having absorbed 10 cubic centimeters of oxygen per gram of polymer after about 10 hours of exposure at 140° C. The polyethylene sample containing 3 percent carbon black in addition to 0.1 percent of di-4,4'-acetanilide disulfide (curve 2) has withstood about 475 hours of accelerated test exposure before absorbing the critical amount of 10 cubic centimeters of oxygen under identical test conditions. The curve designated "standard" has reference to a polyethylene sample containing no additives under the same test conditions as in Figs. 1 and 2.

Curves 1 and 2 of Fig. 4 are plotted from similar test runs made on polyethylene samples containing 0.1 percent of benzothiazyl disulfide. In addition the sample corresponding with curve 2 contained 3 percent by weight of dispersed carbon black particles. This figure also contains a "standard" curve as do the other figures. Whereas the sample containing no carbon black (curve 1) had absorbed 10 cubic centimeters of oxygen after about 16 hours of exposure to an oxygen atmosphere at 140° C. (point 30), the sample containing carbon black in addition to the benzothiazyl disulfide under identical test conditions had absorbed 10 cubic centimeters of oxyen only after about 365 hours of exposure.

The retarder used in the samples for which test data is presented on Fig. 5 was a symmetrical compound of two heterocyclic rings joined through a disulfide linkage and known as N,N' dimorpholine disulfide. From curve 1 representing the polyethylene sample containing 0.1 percent of morpholine disulfide and no carbon black, it is seen that the critical limit of 10 cubic centimeters oxygen absorption per gram was attained after approximately 143 hours (point 40) of exposure while from curve 2, it is seen that the sample containing the identical amount of the same retarder and containing in addition 3 percent of dispersed carbon black particles had absorbed 10 cubic centimeters of oxygen only after about 640 hours (point 41) indicating a protected period more than four times as great for the sample containing carbon black. Comparison of curve 1 with the "standard" curve indicates that use of this retarder material results in a significant protective period in clear polyethylene, whereas, the plotted data for the other materials shown on Figs. 1, 2, 3 and 4 manifest no appreciable protective period in the absence of carbon black. By the same token, the protection afforded the polymeric sample containing carbon black is also greater for N,N' dimorpholine disulfide than for the materials of the other figures. By way of explanation, the apparent break in curve 1 of Fig. 5 after about 120 hours appears to indicate that some portion of the morpholine disulfide molecule is behaving in a manner resembling that of the usual secondary amine type antioxidant when used in clear polymeric samples. In accordance with conventional practice the first portion of curve 1 from the origin to the break at about 120 hours (point 42) is referred to as the "induction period." After the induction period has terminated, oxidation proceeds at a more rapid rate indicating substantial depletion of the antioxidant resulting in increased slope of that portion of the curve following point 42.

Accelerated test data for clear and black samples of polyethylene containing di-ortho-tolyl disulfide is consistent with that for the retarder materials discussed in conjunction with the figures. Whereas the sample containing carbon black had absorbed 10 cubic centimeters of oxygen per gram of polymer only after 515 hours of exposure at 140° C., the clear sample had absorbed this amount of oxygen after only 2 or 3 hours.

It is our opinion that the difference in form between curves 1 and 2 of Fig. 5 indicates that the protected mechanisms in the clear and in the black are dissimilar, it appearing that the substantially linear form of curve 2 represents a mechanism similar to that for the samples containing the other retarders for which curves are presented. The fact that the five curves denoted curve 2 for Figs. 1 through 5, do not shown a signficant change in slope over times of exposure ranging from 120 hours up to over 600 hours of accelerated test, during which time a large portion of the retarder present would have reacted at least once with the oxygenated radicals of the polymer, indicates that the reaction might be such as to cause regeneration of the retarder.

A postulated reaction which would explain the above results and which is consistent with known reactions follows:

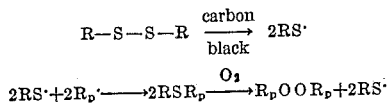

$$2RS \cdot + 2R_p \cdot \longrightarrow 2RSR_p \xrightarrow{O_2} R_pOOR_p + 2RS \cdot$$

in which R—S—S—R is representative of the disulfide retarders of this invention and $R_p \cdot$ represents an oxygenated polymeric radical. Although the retarder is represented as a symmetrical molecule to simplify the postulated reaction, it is, of course, not intended to limit the invention to this class of compounds. The equation is intended as a general explanation of the reaction which occurs in any essentially saturated polymer containing tertiary hydrogen atoms such as polyethylene containing one of the retarders of this invention in combination with carbon black.

As the equation indicates, breakdown of the retarder in the presence of carbon black results in the formation of the RS· radical which then retards oxidation of the polymeric chain to produce the $RSR_p$ structure which is then oxidized to regenerate the RS· radical together with the $R_pOOR_p$ structure. Apparently this $R_pOOR_p$ compound is fairly stable and does not result in the initiation of a chain reaction such as is normally produced in a polymeric material such as polyethylene in the presence of oxygen.

Why the reaction set forth above does not occur in clear polyethylene is not known, although it is postulated that the RS· radical is produced only under the catalytic influence of carbon black. It should be especially noted that the equation above is offered only as a possible explanation of the retarder action in view of the known results, and dependence is in no way had upon it either as a basis for the specification or as substantiation of the claims herein.

As is amply set forth herein, although the invention has been primarily expressed in terms of specific retarders and specific amounts of carbon black in specific saturated hydrocarbon polymeric materials, a person skilled in the art will recognize that the principles expressed herein are equally applicable to other retarders and polymers within the general formula and ranges of composition all of which have been set forth. For example, although the specific retarders reported herein are symmetrical, cyclic disulfides in which both cyclic moieties are the same, as symmetrical cyclic disulfides in which they differ, work equally well and afford appreciable periods of protection when incorporated in essentially saturated hydrocarbon polymers of the class including tertiary hydrogen atoms also containing dispersed carbon black particles.

What is claimed is:

1. A composition which is stabilized against oxidation comprising from 0.5 percent to 5 percent by weight of carbon black particles of a maximum size of 1,000 angstroms, from 0.01 percent to 5 percent of a compound containing at least one unit of the structure R—S—S—R' in which R and R' are ring structures each containing at least one carbon atom and in which the maximum number of carbon atoms in each of the said ring structures including substituents is 30, and an essentially saturated hydrocarbon polymeric material selected from the group consisting of polymers of ethylene, propylene, butene-1, 3-methyl butene-1, 4-methyl pentene-1, 4,4-dimethyl pentene-1, dodecene-1, 3-methyl pentene-1, and mixtures of any of these materials, and in which all weight percents are based on the said composition.

2. The composition of claim 1 in which the polymeric material is a homopolymer.

3. The composition of claim 1 in which the polymeric material is a copolymer.

4. The composition of claim 1 in which the compound is a monomer.

5. The composition of claim 4 in which the compound is diphenyl disulfide.

6. The composition of claim 4 in which the compound is diacetanilide disulfide.

7. The composition of claim 4 in which the compound is N,N' dimorpholine disulfide.

8. The composition of claim 4 in which the compound is benzothiazyl disulfide.

9. The composition of claim 1 in which the compound is the polymerization product of dithiohydroquinone.

10. The composition of claim 1 in which the polymeric material is polyethylene.

References Cited in the file of this patent

UNITED STATES PATENTS

| | | |
|---|---|---|
| 2,160,172 | Rosen et al. | May 30, 1939 |
| 2,431,303 | Billmeyer | Nov. 25, 1947 |
| 2,512,459 | Hamilton | June 20, 1950 |
| 2,643,241 | Crouch et al. | June 23, 1953 |
| 2,843,577 | Friedlander et al. | July 15, 1958 |

FOREIGN PATENTS

| | | |
|---|---|---|
| 201,160 | Australia | Jan. 11, 1956 |

OTHER REFERENCES

Raff: "Polyethylene," 1956, page 402, Interscience Publisher Inc.

Schildknecht: "Polymer Processes," February 28, 1956, page 535, Interscience Publishers Inc.